United States Patent [19]

Stearns

[11] Patent Number: 5,285,890
[45] Date of Patent: Feb. 15, 1994

[54] VIBRATORY FEEDER

[75] Inventor: Ralph A. Stearns, Bozrah, Conn.

[73] Assignee: Spirol International Corporation, Danielson, Conn.

[21] Appl. No.: 874,294

[22] Filed: Apr. 24, 1992

[51] Int. Cl.$^5$ ............................................. B65G 27/16
[52] U.S. Cl. .................................. 198/766; 198/752; 198/763
[58] Field of Search ............... 198/750, 752, 754, 763, 198/766

[56] References Cited

U.S. PATENT DOCUMENTS

| | | | |
|---|---|---|---|
| 2,200,116 | 5/1940 | Maguire et al. | 198/725 |
| 2,939,567 | 6/1960 | Mazura et al. | 221/12 |
| 3,053,379 | 9/1962 | Roder et al. | 198/770 |
| 3,180,158 | 4/1965 | Morris | 198/766 X |
| 3,317,041 | 5/1967 | Century | 198/752 X |
| 3,322,260 | 5/1967 | Schwenzfeier . | |
| 3,668,939 | 6/1972 | Schrader | 198/752 X |
| 3,786,912 | 1/1974 | Taylor . | |
| 4,260,052 | 4/1981 | Brown | 198/763 |
| 4,315,817 | 2/1982 | Popper | 198/766 X |
| 4,356,911 | 11/1982 | Brown | 198/766 |
| 4,378,064 | 3/1983 | Brown | 198/769 |

FOREIGN PATENT DOCUMENTS 1119725  7/1968  United Kingdom ................ 198/752

OTHER PUBLICATIONS

Parts Feeders, Inc.–Horizontal Power Tracks Fact Sheet.
Vibromatic Company, Inc.–Straight Line Drive Units-SL–4011 Fact Sheet.
Vibromatic Company, Inc.–Straight Line Drive Units-SL–3011 Fact Sheet.
Vibromatic Company, Inc.–Straight Line Drive Units-SL–2011 Fact Sheet.
Syntron Parts Handling Accessory Equipment Linear Parts Feeders Fact Sheet.

Primary Examiner—James R. Bidwell
Attorney, Agent, or Firm—Chilton, Alix & Van Kirk

[57] ABSTRACT

A linear vibratory feeder having a base, an overlying track support plate and a counterweight with an internal structure between the base and support plate and a pair of outer side plates secured to each of a plurality of separate, longitudinally spaced parts of the internal structure. A first pair of vertical, relatively flexible, flat leaf springs extend between the base and internal structure and a second pair of generally upright but slightly inclined, flat leaf springs extend between the internal structure and support plate. The first and second pairs of leaf springs are mounted in overlapping relationship to provide a low profile feeder and a short moment arm between the centers of gravity of the upper support plate assembly and counterweight.

18 Claims, 3 Drawing Sheets

VIBRATORY FEEDER

BACKGROUND AND SUMMARY OF THE INVENTION

The present invention relates generally to vibratory feeders of the type having an elongated track and operable to feed parts forwardly along the track by longitudinal oscillation or vibration of the track. The present invention relates more particularly to a new and improved vibratory feeder of the type described having a configuration of component parts providing superior performance and greater design flexibility.

Examples of vibratory feeders of the type described are disclosed in U.S. Pat. No. 3,786,912, dated Jan. 22, 1974 and entitled "Linear Vibratory Feeder" and U.S. Pat. No. 4,260,052, dated Apr. 7, 1981 and entitled "Vibratory Feeder Leaf Spring Arrangement". In such vibratory feeders, the parts are fed forwardly along an elongated linear track by longitudinal vibratory motion of the track generally parallel to but inclined upwardly from the longitudinal axis of linear feed. Thus, the vibratory motion has a primary component parallel to the axis of feed and a secondary component normal to the axis of feed. As the vibrating track moves in a forward direction, it carries each part forwardly a small step while propelling the part upwardly normal to the axis of feed. As the vibrating track moves in the opposite direction, each part floats partly or fully on or above the track support surface. That cycle is repeated at a high frequency to feed the parts in small steps forwardly along the track.

Such vibratory feeders typically are used to transport parts in succession from a bowl feeder to an escapement, deadnest or other part receiver. Storage and orientation of the parts is normally provided by the bowl feeder. In some applications, it is essential that there be smooth and consistent track motion normal to the axis of feed along the full length of the track to maintain part orientation and to ensure that the parts are fed evenly along the track. Smooth and consistent track motion normal to the axis of feed is also necessary if the track has an overlying or other retaining structure for retaining the parts on the track. Otherwise, excessive track vibration normal to the axis of feed can cause the parts to engage the retaining structure and to be fed backwardly by the retaining structure during the reverse motion of the track.

When vibratory feeders of the type described are operated to produce the desired vibratory motion of the track, additional undesirable track vibrations are usually produced. For example, an undesirable track vibration is produced by the oscillating force couple which produces the desired vibratory motion. This undesirable vibration is particularly problematic because it has a component normal to the axis of feed which varies along the length of the track. Specifically, the normal component increases along the track in opposite directions from approximately the midpoint of the track. Where the intended and undesirable components normal to the direction of feed are additive, the resultant track motion normal to the direction of feed can cause the parts to bounce excessively. Where the intended and undesirable normal components are subtractive, the resultant track motion normal to the direction of feed can be inadequate to properly feed the parts or in extreme situations can feed the parts backwardly.

It is often desirable to employ a track substantially longer than the track platform used to support and vibrate the track. However, lengthening the track magnifies the undesirable component of vibration normal to the direction of feed. The magnified vibration in combination with the greater track flexure at the outer ends of the track significantly compounds the problem. Track motion normal to the axis of feed can be excessive at one end of the track and insufficient or even out-of-phase at the other end of the track. As a consequence, the parts may bounce excessively at one end of the track, stop at an intermediate point of zero or reduced vibratory motion and be fed backwardly at the opposite end of the track.

A principal aim of the present invention is to provide a new and improved vibratory feeder of the type described which provides generally smooth and consistent track motion normal to the axis of feed along the full length of the track.

Another aim of the present invention is to provide a new and improved vibratory feeder of the type described which provides a higher feed rate by providing increased track motion in the direction of feed. In accordance with the present invention, a relatively low angle of inclination of intended vibratory motion is provided which increases the intended track motion in the direction of feed and reduces the intended track motion normal to the direction of feed.

Another aim of the present invention is to provide a new and improved vibratory feeder of the type described having an oscillating two-mass system which is supported to minimize the transmission of vibrations to and from the two-mass system, to minimize the resistance to oscillation and to minimize the absorption of energy from the oscillating system.

A further aim of the present invention is to provide a new and improved vibratory feeder of the type described useful with tracks of different lengths and weights and with tracks mounted at different longitudinal positions on the vibratory feeder.

Another aim of the present invention is to provide a new and improved vibratory feeder of the type described having a low profile and an oscillating two-mass system with a short moment arm between the centers of gravity of the two oscillating masses.

Another aim of the present invention is to provide a new and improved vibratory feeder of the type described which is economical to manufacture, easy to assemble and disassemble and which permits ready modification and adjustment. According to the present invention, the vibratory feeder has a new and improved configuration of component parts which provides greater flexibility in tuning the feeder for each application.

Other objects will be in part obvious and in part pointed out more in detail hereinafter.

A better understanding of the invention will be obtained from the following detailed description and the accompanying drawings of an illustrative application of the invention.

DESCRIPTION OF PREFERRED EMBODIMENT

Figure 1:
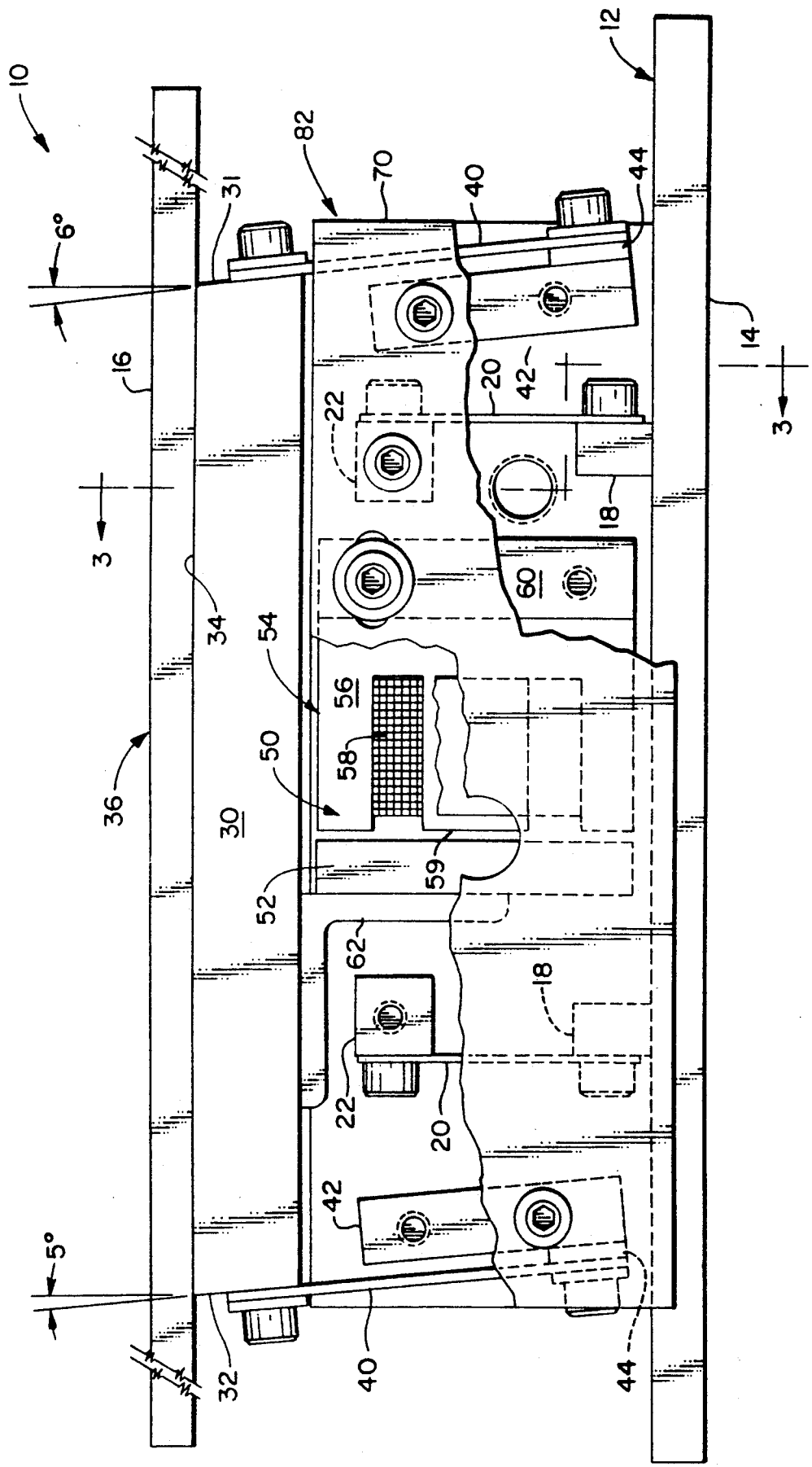
FIG. 1 is a side elevation view, partly broken away, of a vibratory feeder and track assembly incorporating an embodiment of the present invention.
Figure 2:
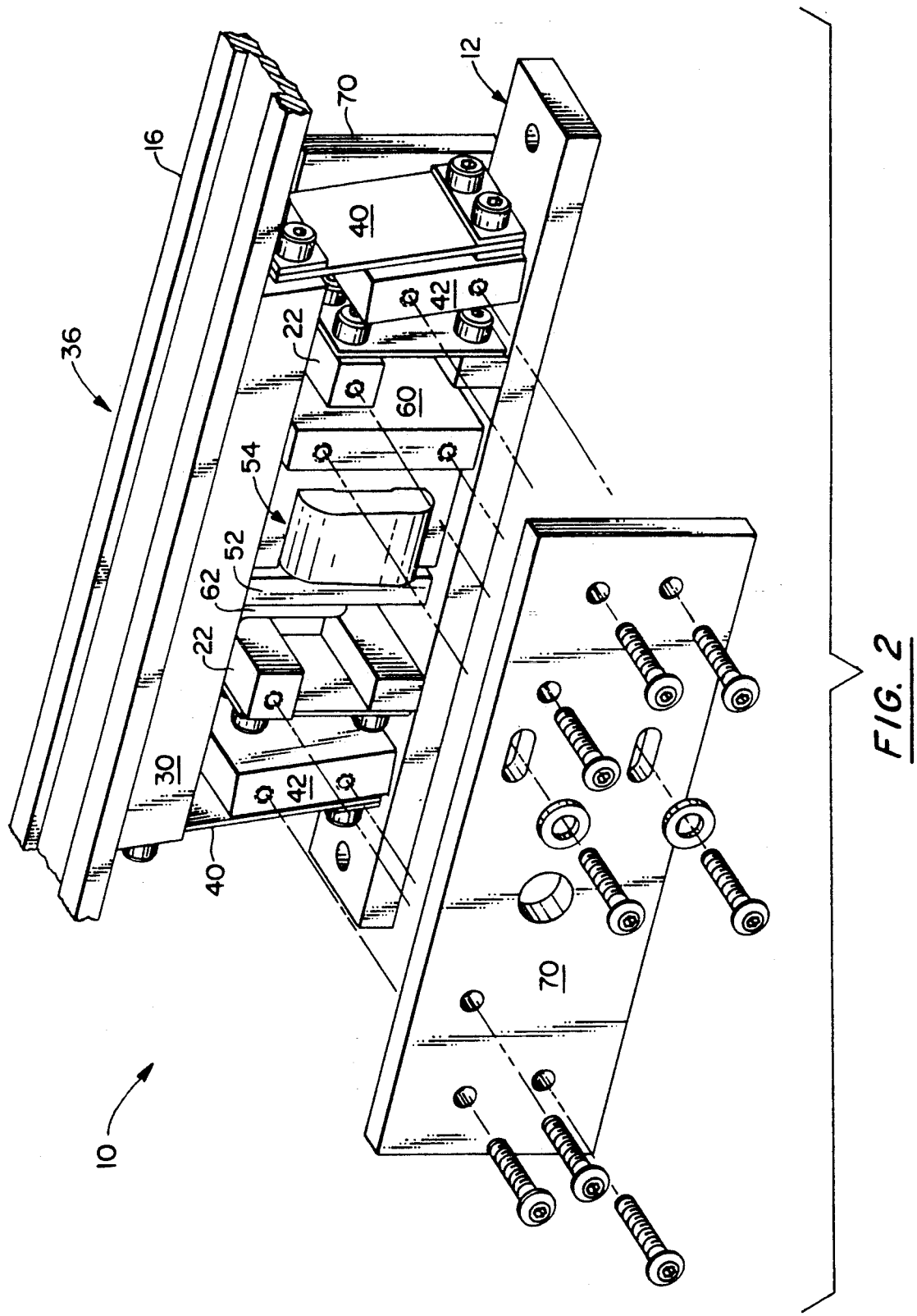
FIG. 2 is an isometric view, partly exploded and partly broken away, of the assembly.
Figure 3:
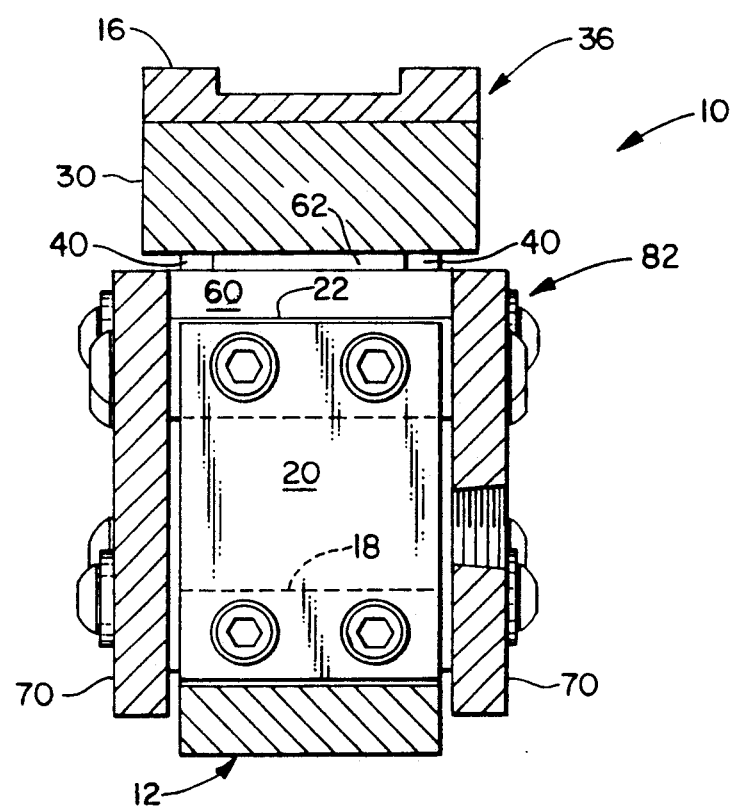
FIG. 3 is a transverse section view, partly in section, of the assembly.

In the drawings, like numbers are employed to designate the same or similar parts. A vibratory feeder and track assembly 10 incorporating a preferred embodiment of the present invention is shown in FIGS. 1, 2 and 3. The feeder 10 is composed of many individual parts secured together by suitable machine screws so that the parts can be readily assembled and disassembled. The feeder 10 has two isolation springs 20 and two mainsprings 40, both hereafter described, each provided by one or more standard, flat, glass reinforced, plastic spring blades. Such spring blades are used because of their physical characteristics, hereafter described. The remaining parts of the feeder 10 are made of metal and are mostly thick, rigid, metal parts, formed from selected lengths of generally standard plate, bar or channel stock.

The feeder 10 has an elongated, thick, rigid base 12 which is adapted to be rigidly mounted on a horizontal surface of a suitable table, pedestal or other support (not shown). The flat, bottom supporting surface 14 of the base 12 is parallel to the longitudinal axis of the feeder 10 and longitudinal axis of linear feed provided by an elongated track 16. The base 12 has a pair of upstanding, axially spaced and transversely extending, integral support bars or posts 18. The remaining components of the feeder 10 (all of which vibrate during operation of the feeder 10) are supported on the fixed support bars 18 through a pair of upstanding leaf springs 20 which serve as isolation springs. In the relaxed condition of the feeder 10, the isolation springs 20 are flat and parallel and extend normal to the axis of linear feed and the horizontal bottom 14 of the base 12. The springs 20, in their lengthwise or vertical direction, are sufficiently strong and rigid to rigidly support the vertical load of the oscillating components of the feeder. The springs 20 are compliant and weak in the horizontal direction to minimize their resistance to the oscillation of the supported components. For that reason each spring 20 is preferably provided by a single plastic spring blade. The lower ends of the two springs 20 are secured by machine screws to the lower, fixed support bars 18. The upper ends of the two springs 20 are secured by machine screws to a pair of upper, transverse mounting bars 22.

An elongated, thick, rigid, top plate or track support platform 30 is mounted slightly above the top of the vertical isolation springs 20 to overlie the base 12 and to minimize the height of the top plate 30 above the base 12. The flat, horizontal top surface 34 of the top plate 30 is parallel to the bottom surface 14 of the base 12 and the longitudinal axis of linear feed. A suitable track 16 is fastened by machine screws to the flat top surface 34. The track 16 is designed and configured for each particular application in accordance with the shape of the parts to be fed. The length and weight of the track 16 and the longitudinal position of the track 16 on the top plate 30 are also application dependent. The weight of the track 16 can vary significantly (e.g., from 2.5 to 23 pounds) without adversely affecting the performance of the feeder 10.

The center of gravity ("CG") of the top plate or feed assembly 36 (which includes the top plate 30, track 16 and an armature plate 52 hereafter described) is preferably made as low as practical. Also, the weight of the feed assembly 36 is made as low as practical consistent with providing smooth and even vibratory motion of the top plate 30 and track 16. The top plate 30 is preferably made of aluminum to reduce its weight.

The front and rear end faces 31, 32 of the top plate 30 are inclined downwardly and forwardly relative to a transverse vertical plane (extending normal to the longitudinal axis of the feeder 10). The angles of inclination of both faces 31, 32 are preferably less than 10°. Specifically, the angle of inclination of the front end face 31 is preferably approximately 6°. The angle of inclination of the rear end face 32 is slightly less and for example is approximately 5°. A second, upper pair of flat leaf springs 40 serve as mainsprings for supporting the feed assembly 36 on a counterweight 82, hereafter described, and to provide for oscillation or vibration of the feed assembly 36 and counterweight 82 in opposite longitudinal directions. The mainsprings 40 are relatively stiff and each typically consists of two or more flat spring blades. The upper ends of the generally upright mainsprings 40 are secured by machine screws and washer plates to the end faces 31, 32 of the top plate 30. The lower ends of the flat mainsprings 40 are similarly secured by machine screws and washer plates to the lower ends of a pair of flat, transverse, mounting plates 42. Each of the leaf springs 40, in the relaxed condition of the feeder 10, has approximately the same angle of inclination as the respective end face of the top plate 30.

A spacer plate 44 is provided between the lower end of each mainspring 40 and the respective mounting plate 42 to provide adequate clearance for mainspring flexure. The thick, flat, mounting plates 42 serve as part of the counterweight 82 and extend upwardly parallel to the mainsprings 40 and assist in raising the CG of the counterweight 82. The two mainsprings 40 extend downwardly to slightly above the base 12. The generally upright mainsprings 40 are longer than and nearly fully overlap the isolation springs 20. As shown, the two mainsprings 40 are preferably located longitudinally outwardly (immediately forwardly and rearwardly) of the two isolation springs 20. The relative longitudinal position of the two sets of springs 20, 40 may be reversed if desired.

A heavy duty electromagnet 50 is provided for vibrating the feed assembly 36 at high frequency. The electromagnet 50 is mounted between the inner pair of springs. In the disclosed embodiment, the axis of the electromagnet 50 is perpendicular to the flat isolation springs 20 and parallel to the longitudinal axis of the feeder 10 and is approximately midway between the base 12 and top plate 30 The electromagnet 50 comprises a flat armature plate 52 and a separate coil assembly 54 having an E-shaped core 56, a coil 58 encircling the central leg 59 of the core 56 and a mounting plate 60 fastened to the core 56. The armature plate 52 is secured to the top plate 30 by an L-shaped bracket 62 fastened by machine screws to the bottom of the top plate 30 and rear face of the armature plate 52. The heavier coil assembly 54 is made part of the counterweight 82. As shown, the electromagnet 50 is preferably oriented to magnetically drive the top plate 30 in the forward direction.

A working air gap is provided between the opposing flat parallel pole faces of the armature plate 52 and E-shaped core 56. The size of the air gap is limited by the maximum magnetic force and current of the electromagnet 50. The air gap is preferably established to minimize the electrical energy needed for vibrating the feed assembly 36 at the desired frequency (e.g., 60 Hertz) and to prevent engagement of the opposed pole faces.

A pair of identical, flat, parallel side plates 70 are provided at the sides of the base 12 and the sides of an internal structure of the counterweight 82 located between the base 12 and top plate 30. Each side plate 70 is secured by machine screws to and in engagement with each isolation spring mounting bar 22, the coil assembly mounting plate 60 and each mainspring mounting plate 42. The two parallel side plates 70 and those intermediate, transversely extending and longitudinally spaced parts 22, 60, 42 are thereby secured together to provide a rigid sandwich or assembly which forms the counterweight 82. The transverse width of the internal parts 22, 60, 42 is established so that the two outer side plates 70 do not engage the sides of the base 12 or the side edges of the leaf springs 20, 40. The coil assembly 54 is secured to and between the parallel plates 70 and the coil assembly mounting plate 60 is longitudinally adjustable on the side plates 70 to enable the working air gap to be established for each application.

The electromagnet 50 is operated at the desired high frequency (e.g., 60 Hertz) to oscillate or vibrate the feed assembly 36 at the same high frequency, preferably at the natural frequency of the two-mass system which comprises the counterweight 82, feed assembly 36 and interconnecting mainsprings 40. The reaction force of the electromagnet 50 oscillates or vibrates the counterweight 82 in generally 180° out-of-phase synchronism with the feed assembly 36. The axis of oscillation of the counterweight 82 is perpendicular to the flat isolation springs 20 and parallel to the longitudinal axis of the feeder 10. Because of the inclination of the two mainsprings 40, the axis of oscillation of the feed assembly 36 is inclined upwardly slightly (i.e., approximately 5° or 6° in the described embodiment) from the longitudinal axis of the feeder 10. The relatively low angles of inclination of the mainsprings 40 provide for increasing the horizontal vibration component in relation to the vertical component.

Thus, the intended vibratory motion of the feed assembly 36 has a relatively large primary component parallel to the axis of linear feed and a relatively small secondary component normal to the axis of linear feed. The vibratory motion of the track 16 provides for feeding the parts forwardly during the forward motion of the track 16 and for retracting the track 16 below the parts during the reverse or rearward motion of the track 16. Because of the normal component of track motion, the parts float partly or fully on or above the supporting surface of the track 16 during the reverse motion of the track 16.

The isolation springs 20 are made as compliant and weak as possible in the horizontal direction to minimize their resistance to the counterweight oscillation and yet rigid and strong enough in the vertical direction to rigidly support the weight of the oscillating two-mass system and transmit the unbalanced forces to the base 12. Accordingly, only a small oscillating force parallel to the longitudinal axis of the feeder 10 is transmitted from the counterweight 82 to the base 12 via the isolation springs 20. Also, only a small portion of the energy of the oscillating counterweight 82 is absorbed by the isolation springs 20. In addition, the isolation springs 20 largely isolate the oscillating two-mass system from potentially disruptive vibrations transmitted through the base 12, for example from other vibration feeders and equipment mounted on the same support or pedestal (not shown).

Neglecting the weak resistance to oscillation provided by the relatively weak isolation springs 20, the two-mass system formed by the feed assembly 36, counterweight 82 and interconnecting mainsprings 40 is freely supported by the isolation springs 20 so that the two masses oscillate in synchronism in 180° out-of-phase relationship. The forces which oscillate the feed assembly 36 and counterweight 82 have horizontal components (i.e., components parallel to the longitudinal axis of oscillation of the counterweight 82) which are equal and opposite. Those force components, except for the resultant force couple, hereafter described, cancel out or counterbalance each other. However, the inertia of the feed assembly 36 normal to the axis of oscillation of the counterweight 82 is not counterbalanced by the counterweight 82. Therefore, the normal component of feed assembly oscillation produces an unbalanced oscillating force which is transmitted via the mainsprings 40 and isolation springs 20 to the base 12. This unbalanced oscillating force is made relatively low by the relatively low angles of inclination of the mainsprings 40. Also, the weight of the feed assembly 36 is minimized, in part to minimize this unbalanced oscillating force.

As the two masses 36, 82 oscillate in synchronism in opposite directions, the mainsprings 40 flex back and forth in generally parallel relationship like the sides of a pantograph. The kinetic energy of each mass is transferred to the mainsprings 40 and then the mainsprings 40 drive the two masses in opposite directions. The two masses 36, 82 are thereby swung back and forth in opposite directions in synchronism. Additional energy is added to the system by the electromagnet 50. The mainsprings 40 are sized (by adding or removing individual flat spring blades) to tune the spring stiffness to achieve a natural frequency which matches the drive frequency of the electromagnet 50.

Neglecting the weak resistance of the isolation springs 20, the relative amplitudes of oscillation of the feed assembly 36 and counterweight 82 along their respective axes of oscillation are inversely proportional to their masses. The total amplitude of the two masses is limited by the working air gap of the electromagnet 50. With the air gap determined by magnet operating parameters, the permitted amplitude of the feed assembly 36 is reduced by the amplitude of the counterweight 82. The counterweight 82 is made substantially heavier than the feed assembly 36 so that a smaller portion of the air gap is consumed by the counterweight oscillation. The smaller counterweight amplitude permits a higher amplitude of oscillation of the feed assembly 36. A higher feed assembly amplitude produces a higher feed rate. Also, a smaller counterweight amplitude provides a lower effective vibration angle (i.e., a lower increase in the vibration angle over the relaxed angle of inclination of the mainsprings 40). Thus, a higher feed rate is achieved with less displacement of the track 16 normal to the axis of feed and less motion of the parts normal to the axis of feed.

Increasing the horizontal stiffness of the isolation springs 20 has the undesirable effect of increasing the amplitude of counterweight oscillation and therefore decreasing the amplitude of feed assembly oscillation. Ideally, the isolation springs 20 rigidly support the oscillating two-mass system in the vertical direction without resisting the horizontal oscillation of the counterweight 82. Partly for that reason, glass reinforced, plastic spring blades are employed because of their relatively low resistance to horizontal flexure and relatively high vertical rigidity and strength (i.e., low stiffness to strength ratio.)

For practical reasons, the CG of the feed assembly 36 is usually above the CG of the counterweight 82. However, the moment arm between the two CG's is preferably held to a minimum and so that, ideally, the CG of the feed assembly 36 lies in approximately the same horizontal plane as the CG of the counterweight 82. Mounting the top plate 30 immediately above the isolation springs 20 and mounting the mainsprings 40 in overlapping relationship with the isolation springs 20 provides a low profile configuration for reducing the moment arm. Also, by appropriately increasing or decreasing the height, length and thickness of the side plates 70, the CG of the counterweight 82 can be raised or lowered and the weight of the counterweight 82 can be increased or decreased. The moment arm between the CG's of the oscillating feed assembly 36 and counterweight 82 can thereby be adjusted to tune the feeder 10 for each application. Reduction of the top plate width to permit the side plates 70 to extend upwardly along the sides of the top plate 30 is also contemplated.

Where the two CG's do not lie on the same horizontal plane, a reaction force couple or rocking force is produced which is directly proportional to the moment arm between the CG's of the two masses 36, 82. The force couple is the force required to decelerate and then reaccelerate the two masses 36, 82, times the moment arm. This unbalanced force couple or rocking force is transmitted to the base 12 and from the base 12 to the feeder support (not shown).

The unbalanced reaction force couple and the previously described unbalanced component of the inertia of the oscillating feed assembly 36 can cause the base 12 and therefore the entire feeder 10 to vibrate. The vibration is more pronounced when the feeder 10 is mounted on a relatively light pedestal support (not shown) of the type typically used. Due to that vibration, those unbalanced oscillating forces can cause the actual component of track oscillation normal to the direction of feed to vary along the length of the track 16. Specifically, the unbalanced reaction force couple has the effect of increasing the normal component of track vibration at the front of the track and decreasing the normal component at the rear of the track. The additional normal component increases in each direction from approximately the midpoint of the top plate 30 or track 16.

The different inclinations of the two mainsprings 40 are established to partly or fully offset the effect of the described reaction force couple. More specifically, excluding the effect of the described reaction force couple, since the inclination of the rear mainspring 40 is less than that of the front mainspring 40, the normal component of feed assembly oscillation is less at the rear of the top plate 30 than at the front of the top plate 30. A second reaction force couple is thereby produced in opposition to the first described reaction force couple. Thus, the different inclinations of the two mainsprings 40 partly or fully offset the effect of the first described reaction force couple and help provide a relatively constant normal component of track vibration along the full length of the track. Also, the thickness of each mainspring spacer plate 44 is preferably selected to establish the effective inclination of the respective mainspring 40 to minimize any variation in the normal component of actual track vibration along the track.

Ideally, the CG of the feed assembly 36 and CG of the counterweight 80 lie on the force axis of the electromagnet 50 to eliminate any force couple between each of those oscillating assemblies and the force axis of the electromagnet 50. Any moment arm between the CG of the feed assembly 36 and the force axis of the electromagnet 50 will produce an internal couple or vibration (as well as the desired vibration) of the feed assembly 36. Likewise, any moment arm between the CG of the counterweight 82 and the force axis of the electromagnet 50 will produce an internal couple or vibration (as well as the desired vibration) of the counterweight 82. By reducing the moment arm between each CG and the force axis of the electromagnet 50, the equal and opposite reaction couple is thereby reduced. This is accomplished by reducing the moment arm between the two CG's.

As will be apparent to persons skilled in the art, various modifications, adaptations and variations of the foregoing specific disclosure can be made without departing from the teachings of the present invention.

I claim:

1. In a vibratory feeder for feeding parts in a forward direction along a longitudinally extending axis of feed, comprising a base, a track support overlying the base, a counterweight located at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinally vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight has a sandwich construction comprising an internal structure between the base and overlying track support and a pair of outer, longitudinally extending, side plates secured to opposite lateral sides of said internal structure to form an integrated, rigid counterweight, wherein said internal structure comprises a plurality of separate, longitudinally spaced parts secured to the side plates, wherein said first generally upright leaf springs extend between the base and said internal structure to support the counterweight on and close to the base and wherein said second generally upright leaf springs are longitudinally spaced from and overlap, in a direction normal to the axis of feed, at least a substantial portion of the first generally upright leaf springs and extend between the track support and said internal structure to support the track support on and close to the counterweight.

2. A vibratory feeder according to claim 1 wherein said first leaf springs, in the relaxed condition of the vibratory feeder, are generally flat parallel springs extending generally normal to said longitudinally extending axis of feed.

3. A vibratory feeder according to claim 1 wherein each of said second leaf springs, in the relaxed condition of the vibratory feeder, is a generally flat spring extending at a slight angle of inclination to a transverse plane normal to said longitudinally extending axis of feed.

4. A vibratory feeder according to claim 3 wherein said angle of inclination of each of said second leaf springs is less than 10°.

5. A vibratory feeder according to claim 1 wherein the coil assembly of the electromagnet forms part of the counterweight and is mounted on and between the side plates.

6. A vibratory feeder according to claim 1 wherein the track support is a thick rigid flat plate with longitudinally spaced forward and rear end faces inclined downwardly and forwardly with respect to a transverse plane normal to the longitudinal axis of feed and wherein said plurality of second leaf springs comprises forward and rear leaf springs with upper ends secured to the forward and rear end faces respectively of the track support plate.

7. A vibratory feeder according to claim 1 having two of said second leaf springs and two of said first leaf springs mounted between said two second leaf springs.

8. A vibratory feeder according to claim 7 wherein the lower ends of said second leaf springs are slightly above the base.

9. In a vibratory feeder for feeding parts in a forward direction along a longitudinally extending axis of feed, comprising a base, a track support overlying the base, a counterweight located at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight has a sandwich construction comprising an internal structure between the base and overlying track support and a pair of outer, longitudinally extending, side plates secured to opposite lateral sides of the internal structure to form an integrated, rigid counterweight on the base and wherein said second generally upright leaf springs are longitudinally spaced from and overlap the first generally upright leaf springs and extend between the track support and said internal structure to support the track support on the counterweight, and wherein said internal structure of the counterweight comprises a plurality of separate, longitudinally spaced parts including separate, longitudinally spaced spring mounts for the lower ends of said second leaf springs respectively and wherein said internal structure further comprises a spacer plate between the lower end of each said second leaf spring and the respective spring mount.

10. A vibratory feeder according to claim 9 wherein, in the relaxed condition of the vibratory feeder, said second leaf springs are generally flat and each of said spring mounts is a flat plate mounted in spaced, generally parallel relationship with the respective second leaf spring.

11. In a vibratory feeder for feeding parts in a forward direction along a longitudinally extending axis of feed, comprising a base, a track support overlying the base, a counterweight located, at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight comprises an internal structure between the base and overlying track support and a side structure secured to said internal structure to form an integrated, rigid counterweight, wherein said internal structure comprises a plurality of separate, longitudinally spaced parts secured to said side structure, wherein said first generally upright leaf springs extend between the base and longitudinally spaced parts respectively of said internal structure to support said internal structure on and close to the base and wherein said second leaf springs are longitudinally spaced from and overlap, in a direction normal to the axis of feed, at least a substantial portion of said first leaf springs and extend from the track support to close to the base and between the track support and longitudinally spaced parts respectively of said internal structure to support the track support on and close to said internal structure.

12. A vibratory feeder according to claim 11 wherein the counterweight further comprises a pair of flat parallel side plates secured to opposite sides of the intermediate structure.

13. A vibratory feeder according to claim 11 wherein said first leaf springs, in the relaxed condition of the vibratory feeder, are generally flat parallel springs extending generally normal to said longitudinally extending axis of feed.

14. In a vibratory feeder for feeding parts in a forward direction along a longitudinally extending axis of feed, comprising a base, a track support overlying the base, a counterweight located, at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight comprises an internal structure between the base and overlying track support and a side structure secured to said internal structure to form an integrated, rigid counterweight, wherein said internal structure comprises a plurality of separate, longitudinally spaced parts secured to said side structure, wherein said first leaf springs extend between the base and longitudinally spaced parts respectively of said internal structure to support said internal structure on and close to the base, wherein said first leaf springs, in the relaxed condition of the vibratory feeder, are generally flat parallel springs extending generally normal to said longitudinally extending axis of feed, wherein said second leaf springs are longitudinally spaced from and overlap, in a direction normal to the axis of feed, at least a substantial portion of said first leaf springs and extend from the track support to adjacent the base and between the track support and longitudinally spaced parts respectively of said internal structure to support the track support on and close to said internal structure and wherein the counterweight is mounted by said first leaf springs for longitudinal vibratory motion parallel to the longitudinally extending axis of feed.

15. In a vibratory feeder for feeding parts in a forward direction along a longitudinally extending axis of feed, comprising a base, a track support overlying the base, a counterweight located at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight has a sandwich construction comprising an internal structure between the base and overlying track support and a pair of outer, longitudinally extending, side plates secured to opposite lateral sides of the internal structure to form an integrated, rigid counterweight, wherein said first generally upright leaf springs extend between the base and said internal structure to support the counterweight on the base, wherein said second generally upright leaf springs are longitudinally spaced from and overlap the first generally upright leaf springs and extend between the track support and said internal structure to support the track support on the counterweight, wherein each of said second leaf springs, in the relaxed condition of the vibratory feeder, is a generally flat spring extending at a slight angle of inclination to a transverse plane normal to said longitudinally extending axis of feed, and wherein there are two of said second leaf springs and wherein said angle of inclination of one of said second leaf springs is approximately 5° and said angle of inclination of the other of said second leaf springs is slightly greater.

16. In a vibratory feeder for feeding parts in a forward direction along a longitudinally extending axis of feed, comprising a base, a track support overlying the base, a counterweight located at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight has a sandwich construction comprising an internal structure between the base and overlying track support and a pair of outer, longitudinally extending, side plates secured to opposite lateral sides of the internal structure to form an integrated, rigid counterweight, wherein said first generally upright leaf springs extend between the base and said internal structure to support the counterweight on the base, wherein said second generally upright leaf springs are longitudinally spaced from and overlap the first generally upright leaf springs and extend between the track support and said internal structure to support the track support on the counterweight, wherein each of said second leaf springs, in the relaxed condition of the vibratory feeder, is a generally flat spring extending at a slight angle of inclination to a transverse plane normal to said longitudinally extending axis of feed, and wherein said plurality of second leaf springs comprises forward and rear leaf springs, and wherein the angle of inclination of the rear leaf spring is slightly less than the angle of inclination of the forward leaf spring.

17. In a vibratory feeder for feeding parts in a forward direction along a longitudinally extending axis of feed, comprising a base, a track support overlying the base, a counterweight located at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism, one of said parts of the electromagnet being mounted on the track support and the other of said parts forming part of the counterweight; the improvement wherein the counterweight has a sandwich construction comprising an internal structure between the base and overlying track support and a pair of outer, longitudinally extending, side plates secured to opposite lateral sides of the internal structure to form an integrated, rigid counterweight, wherein said first generally upright leaf springs extend between the base and said internal structure to support the counterweight on the base, wherein said second generally upright leaf springs are longitudinally spaced from and overlap the first generally upright leaf springs and extend between the track support and said internal structure to support the track support on the counterweight, wherein said internal structure of the counterweight comprises a plurality of separate, longitudinally spaced parts including separate, longitudinally spaced spring mounts for the upper ends of said first leaf springs respectively and separate, longitudinally spaced spring mounts for the lower ends of said second leaf springs respectively.

18. In a vibratory feeder for feeding parts in a forward direction along a longitudinally extending axis of feed, comprising a base, a track support overlying the base, a counterweight located, at least in part, between the base and overlying track support, a plurality of first, longitudinally spaced, generally upright leaf springs mounting the counterweight on the base, a plurality of second, longitudinally spaced, generally upright leaf springs mounting the track support on the counterweight, said first and second leaf springs permitting longitudinal vibratory motion of the track support generally parallel to but inclined upwardly from the longitudinally extending axis of feed and longitudinal vibratory motion of the counterweight in generally 180° out-of-phase synchronism with the vibratory motion of the track support, the vibratory feeder having an electromagnet, with separate coil assembly and armature parts, for vibrating the track support and counterweight in said generally 180° out-of-phase synchronism one of said parts of the electromagnet being mounted on the track support and the other of said parts forming part of the counterweight; the improvement wherein the counterweight comprises an internal structure between the base and overlying track support and a pair of flat parallel side plates secured to opposite sides of the internal structure, wherein said first generally upright leaf springs extend between the base and said internal structure to support the internal structure on and close to the base and wherein said second leaf springs are longitudinally spaced from and overlap, in a direction normal to the axis of feed, at least a substantial portion of said first leaf springs and extend from the track support to close to the base and between the track support and said internal structure to support the track support on and close to said internal structure.

* * * * *

UNITED STATES PATENT AND TRADEMARK OFFICE
CERTIFICATE OF CORRECTION

PATENT NO. : 5,285,890
DATED : February 15, 1994
INVENTOR(S) : Ralph A. Stearns

It is certified that error appears in the above-indentified patent and that said Letters Patent is hereby corrected as shown below:

Claim 1, column 8, line 34, "longitudinally" should be -- longitudinal --.

Claim 9, column 9, line 54, after "counterweight" insert -- wherein said first generally upright leaf springs extend between the base and said internal structure to support the counterweight --.

Signed and Sealed this

Twentieth Day of September, 1994

*Attest:*

BRUCE LEHMAN

*Attesting Officer*     *Commissioner of Patents and Trademarks*